United States Patent [19]

Kawamura et al.

[11] 4,237,261
[45] Dec. 2, 1980

[54] PROCESS FOR CONTINUOUSLY PRODUCING POLYESTER AND SPUN FIBER

[75] Inventors: Hideo Kawamura; Ichiro Fukami; Shuhei Wada; Fusayuki Yoshikawa, all of Okazaki, Japan

[73] Assignee: Nippon Ester Co., Ltd., Okazaki, Japan

[21] Appl. No.: 75,877

[22] Filed: Sep. 17, 1979

[51] Int. Cl.³ ............................................. C08G 63/22
[52] U.S. Cl. .................... 528/272; 422/134; 422/135; 422/188; 422/224; 528/309
[58] Field of Search ............... 528/272, 309; 422/188, 422/224, 134, 135

[56] References Cited

U.S. PATENT DOCUMENTS

| | | | |
|---|---|---|---|
| 3,359,074 | 12/1967 | Dobo | 422/134 |
| 3,644,294 | 2/1972 | Siclari et al. | 528/272 X |
| 3,841,836 | 10/1974 | Lunsford et al. | 422/134 |
| 4,106,098 | 8/1978 | Moody et al. | 528/309 X |
| 4,138,544 | 2/1979 | Janssen et al. | 528/272 |

*Primary Examiner*—Lucille M. Phynes
*Attorney, Agent, or Firm*—Sughrue, Rothwell, Mion, Zinn and Macpeak

[57] ABSTRACT

In a process for continuously producing polyester which comprises continuously polymerizing bis-$\beta$-hydroxyethyl terephthalate and/or a lower polymer thereof using a plurality of vacuum polymerization reactors equipped with a stirrer disposed in series, the improvement which comprises automatically and continuously measuring stirring power or stirring axis reaction force of at least the final polymerization reactor among the polymerization reactors from which a polymer having a limiting viscosity ($\eta$) of 0.25 or more is removed, and controlling the vacuum in the polymerization reactors based on changes in the stirring power or reaction force so that the stirring power or reaction force is kept at a prescribed level, by which the degree of polymerization of the polymer removed from the polymerization reactors is controlled. A process for producing a polyester spun fiber is also disclosed.

11 Claims, 3 Drawing Figures

PROCESS FOR CONTINUOUSLY PRODUCING POLYESTER AND SPUN FIBER

BACKGROUND OF THE INVENTION

1. Field of the Invention

The present invention relates to a process for continuously producing polyester and to a process for producing a spun fiber.

2. Description of the Prior Art

Linear polyesters comprising polyethylene terephthalate as a main component have generally been produced by a process which comprises producing bis-β-hydroxyethyl terephthalate and/or a lower polymer thereof by esterification of terephthalic acid with ethylene glycol or an ester exchange reaction of dimethyl terephthalate with ethylene glycol, and polymerizing under reduced pressure while removing ethylene glycol.

Both a batch process, which has been used hitherto, and a continuous process which can be used instead of the batch process as a result of recent developments can be used to produce the polyesters. The principal advantages of the continuous process as compared with the batch process are that it is possible to spin the polymer produced by the polymerization reaction directly. The polymer is introduced in a melt state into a spinning step and spun by means of nozzles to produce unstretched filaments. Using the continuous process, steps such as granulating, drying and remelting, which are essential to the batch process can be omitted which decreases the cost and unnecessary residence time that does not contribute to polymerization is shortened to the point at which it is practically nonexistent. In this manner it becomes possible to produce a homogeneous polymer having good uniform quality continuously.

However, in the case of carrying out direct spinning in order to take advantage of the continuous process, non-uniform quality of the polymer produced by the polymerization reaction often causes uneveness in the quality of the unstretched filaments spun by spinning nozzles. The ability to control the quality of the polymer and particularly the degree of polymerization is important in the continuous process.

One example of a method for controlling the degree of polymerization of the polymer is by continuously measuring the melt viscosity (which is directly related to the degree of polymerization) of the polymer removed from the polymerization reactor, and controlling the vacuum in the polymerization reactor so as to keep the viscosity at a definite level. However, when a factor (such as a change in the esterification degree or a change in the feed rate) disturbs the polymerization reaction, the appearance thereof as reflected in a change in the melt viscosity of the polymer is delayed, and, if the vacuum is controlled based on the time at which the melt viscosity changes, the degree of polymerization of the polymer can not be accurately controlled due to the delay in the response time.

The present inventors have paid attention to the fact that the response time of melt viscosity of the polymer at the outlet of the reactor is very slow in the prior process when a disturbance in the polymerization reaction is encountered, which is the principal drawback in the prior control method; and to utilizing the prior control method by substituting the melt viscosity with another control medium having a fast response time.

Namely, in the batch polymerization process, the degree of polymerization of the product has been easily controlled by detecting the melt viscosity by the reaction force applied on the stirring axis (the resistance of the polymer to stirring) and removing the vacuum at the time the desired viscosity is attained (the degree of polymerization gradually increases as the vacuum in the reactor in which the lower polymer is charged increases).

In the batch polymerization process, since the melt viscosity of the polymer in the reactor is uniform, it bears a primary relation to the reaction force on the stirring axis. Further, since the melt viscosity gradually increases from several poises to several thousand poises, the change in the reaction force on the stirring axis is large and it is possible to control the degree of polymerization of the polymer by monitoring the reaction force. However, in the continuous polymerization process, the viscosity of the polymer in the reactor increases from the inlet to the outlet and, consequently, the reaction force on the stirring axis is not always directly related to the melt viscosity of the polymer at the outlet of the reactor. The reaction force on the stirring axis is dominated by the viscosity gradient. Further, in normal operation, the change in the melt viscosity in the reactor is small and, consequently, the change in the reaction force on the stirring axis is small and difficult to detect. Accordingly, it has been assumed that control of the degree of polymerization of the polymer at the outlet of the reactor by monitoring the reaction force on the stirring axis is difficult in continuous polymerization.

SUMMARY OF THE INVENTION

As a result of extensive studies, it has been found, on the basis of the following facts, that the power necessary to stir the polymer in the polymerization reactor (hereafter "stirring power", e.g., the externally applied power of a motor) or the torque on the axis of the stirrer for stirring the polymer (the resistance of the polymer to stirring, hereafter "stirring axis reaction force") can be used as a means of controlling the melt viscosity of the polymer removed from the polymerization reactor, and that it is possible to control with accuracy the degree of polymerization of the polymer removed from the polymerization reactor by controlling the vaccum according to changes in the stirring axis reaction force so as to obtain a definite degree of polymerization. Thus, the present invention is based on the following findings:

1. The response time which appears as a change of the stirring power or a change of the stirring axis reaction force according to disturbances of the polymerization reaction is within several minutes.
2. The stirring power or the stirring axis reaction force is principally dominated by the melt viscosity at the outlet of the reactor. Though it is affected by the viscosity gradient between the inlet and outlet of the reactor, the ratio of the melt viscosity of the polymer at the outlet is several times or more that of the polymer at the inlet under the normal operation.
3. In the polymerization reactor in which limiting viscosity ($\eta$) of the polymer removed is 0.25 or more (the limiting viscosities cited herein are measured at 20° C. in a solvent mixture of phenol and tetrachloroethane (1:1 by weight) unless otherwise indicated), because the stirring power or the stirring axis reaction force in the course of polymerization is very large as compared with that in an empty reactor, the change in the stirring power or the change in the stirring axis reaction force is a sensitive means of monitoring the change in the melt viscosity of the polymer in the polymerization reactor.

4. It is possible to control with accuracy the degree of polymerization of the polymer removed from the reactor by carrying out cascade control of the vacuum in the polymerization reactor by Proportion Integral Derivative (PID) control by measuring automatically and continuously the change of the stirring power or the stirring axis reaction force in order to keep it at a definite value, by which a disturbance of the polymerization reaction under the normal operation is corrected. Namely, the vacuum is adjusted based on changes in the stirring power or reaction force to compensate for changes in the stirring power or reaction force to compensate for changes in the feed rate or esterification degree of the lower polymer introduced into the polymerization system such that there are substantially no changes in spinning amount upon direct spinning and a fiber of uniform quality is obtained.

On the basis of the above it is a principal object of the present invention to continuously produce a homogeneous polymer having uniform quality by controlling the degree of polymerization in the continuous polymerization process by monitoring the stirring power or stirring axis reaction force.

DETAILED DESCRIPTION OF THE INVENTION

The present invention relates to a process for continuously producing polyester which comprises continuously polymerizing bis-$\beta$-hydroxyethyl terephthalate and/or a lower polymer thereof using a plurality of vacuum polymerization reactors equipped with a stirrer disposed in series, which is characterized by automatically and continuously measuring the stirring power or the stirring axis reaction force of at least the final polymerization reactor from which a polymer having a limiting viscosity ($\eta$) of 0.25 or more is removed, and controlling the vacuum in the polymerization reactors according to a change in the stirring power or reaction force so that it is kept at a prescribed level, by which the degree of polymerization of the polymer removed from the polymerization reactor is controlled.

Figure 1:
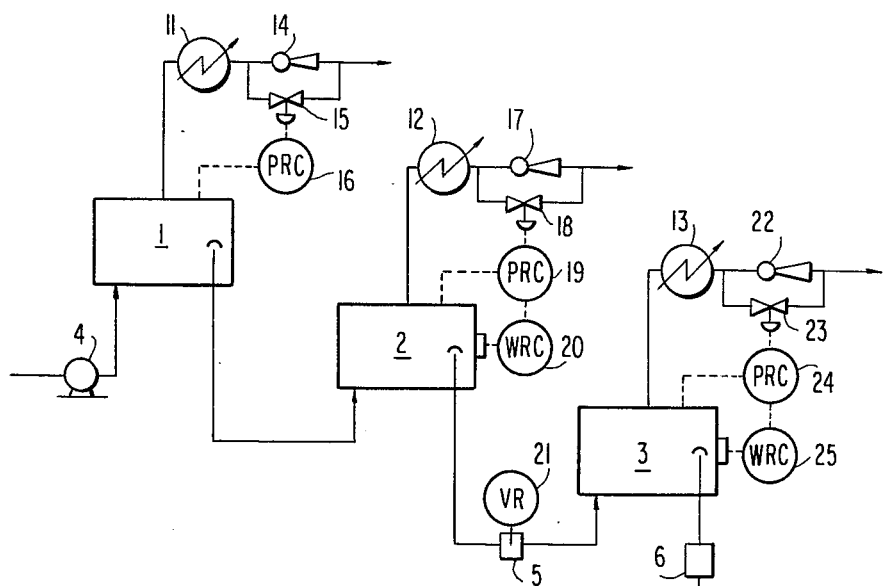
FIG. 1 is an example of a continuous polymerization in accordance with the process of the present invention.

The process of the present invention is illustrated in detail with reference to the accompanying drawings. The bis-$\beta$-hydroxyethyl terephthalate and/or lower polymer thereof is continuously fed into the first stage reactor 1 by means of a feed pump 4 as shown in FIG. 1. Feeding of the polymer from the first stage reactor 1 into the second stage reactor 2, feeding of the polymer from the second stage reactor 2 into the third stage reactor 3, and removing the polymer from the third stage reactor 3 to an intermediate tank 6 are carried out by gravitational flow. The polymer after conclusion of the polymerization reaction in the intermediate tank 6 is removed from vacuum by means of a pressure rising pump 7 and spun by means of a spinning nozzle 10 through a melt viscosimeter 8 and spinning pump 9. Ethylene glycol vapor which is a by-product of the polymerization reaction is condensed by ethylene glycol condensers 11, 12 and 13 and continuously drawn out of the system. Temperatures of the first, second and third stage reactors 1, 2 and 3 are kept at prescribed levels by heating jackets provided on each polymerization reactor. Suitable temperatures are about 270° to 280° C. for the first reactor, 270° to 285° C. for the second reactor and 270° to 285° C. for the third reactor. Prescribed vacuums in the first, second and third stage reactors 1, 2 and 3 are created by means of vacuum generators 14, 17 and 22, control valves 15, 18 and 23 and pressure recording controllers 16, 19 and 24. For example, the first reactor may be maintained at 15 to 30 Torr, the second at 3 to 6 Torr and the third at 0.5 to 3.0 Torr. As the control method, in the first stage reactor 1, constant value control is carried out (i.e., it is maintained at a constant temperature and pressure) because the limiting viscosity ($\eta$) at the outlet is generally 0.25 or less and any changes in stirring power or stirring axis reaction force would be small and could not be used to control the viscosity. In the second and the third stage reactors 2 and 3, the vacuum is automatically controlled by cascade control where a prescribed value of the vacuum is sent to the pressure recording controllers 19 and 24 according to the change of the power or the reaction force measured by stirring power recording controllers (or stirring axis reaction force recording controllers) 20 and 25 so that it is always kept at the prescribed level.

By carrying out the control method of the present invention, it is possible to continuously produce a homogeneous polymer in which variations in quality are very small, because the factors which disturb the polymerization reaction under a normal operation, namely, variations of spinning amount in the direct spinning step, can be sufficiently compensated. Namely, disturbances caused by changes in the feed rate to the first stage rector 1 for keeping a liquid level in the intermediate tank 6 (measured by a liquid level meter) within a prescribed range or the variation of reaction character of bis-$\beta$-hydroxyethyl terephthalate and/or the lower polymer thereof are sufficiently absorbed. The process of the present invention can be carried out if the melt viscosimeter 5 and the recorder thereof 21 provided on a transfer line between the second stage reactor 2 and the third stage reactor 3 and a melt viscosimeter 8 and a recorder thereof 26 provided on the transfer line of the polymer to the spinning step are not present. Various means may be used to measure the stirring power or the reaction force. The stirring power can be measured by a wattmeter and the stirring axis reaction force by attaching a torque meter to the stirring axis.

In the above description, though industrial meters are used for carrying out the control, any means may be used in the present invention, as long as the stirring power or the stirring axis reaction force is continuously monitored and the degree of vacuum is controlled so as to keep the measurement value at a definite level.

Further, in the polymerization reactor in which the limiting viscosity ($\eta$) of the polymer removed is 0.25 or less, the change of the stirring power or the stirring axis reaction force is difficult to detect, even if ($\eta$) increases or decreases and the above-described control is practically impossible to carry out. Therefore, in such a polymerization reactor, the constant value control is carried out.

Further, it is desired that the control method of the present invention be applied to all polymerization reactors in which ($\eta$) is 0.25 or more, in order to carry out control of the degree of polymerization with very high accuracy. However, even if it is applied to the final polymerization reactor, variation in the degree of polymerization becomes very small as compared with that in the prior art process, and it is possible to maintain the polymerization degree within an acceptable range.

Examples of the present invention and for comparison are set forth below.

EXAMPLE 1

A slurry of a mixture of 100 parts of terephthalic acid and 112 parts of ethylene glycol was continuously fed into an esterification reactor prior to the polymerization to continuously produce bis-$\beta$-hydroxyethyl terephthalate and a lower polymer thereof. 0.02 parts of antimony oxide and desired additives were added thereto, and the mixture was continuously fed into the first stage reactor 1 shown in FIG. 1. The reaction temperature of the first stage reactor 1 was 275° C. and the degree of vacuum was kept at 20 Torr.

Figure 2A:
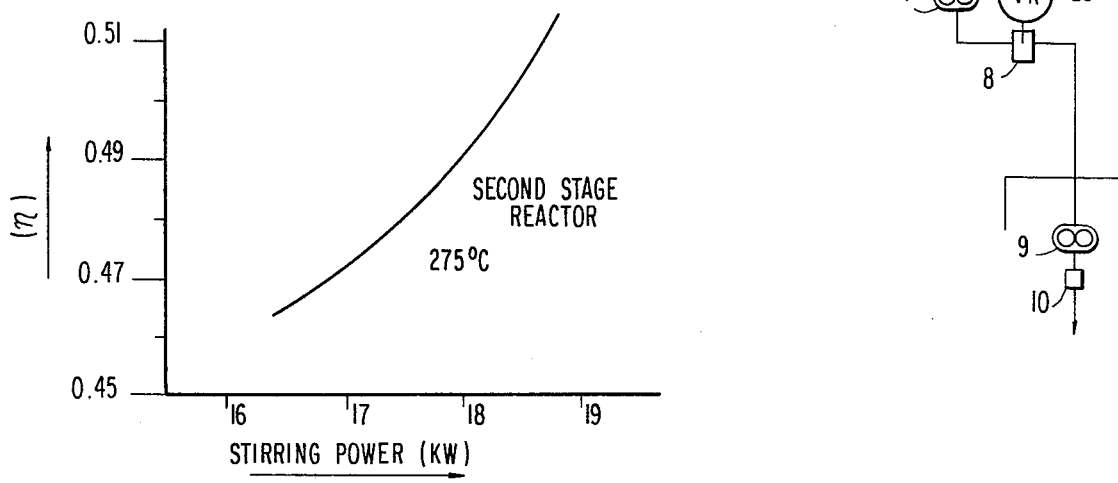
FIG. 2 is a set of graphs illustrating the correlation between stirring power and the limiting viscosity of the polymer in (A) the second reactor and (B) the third reactor under the conditions in Example 1, respectively.
Figure 2B:
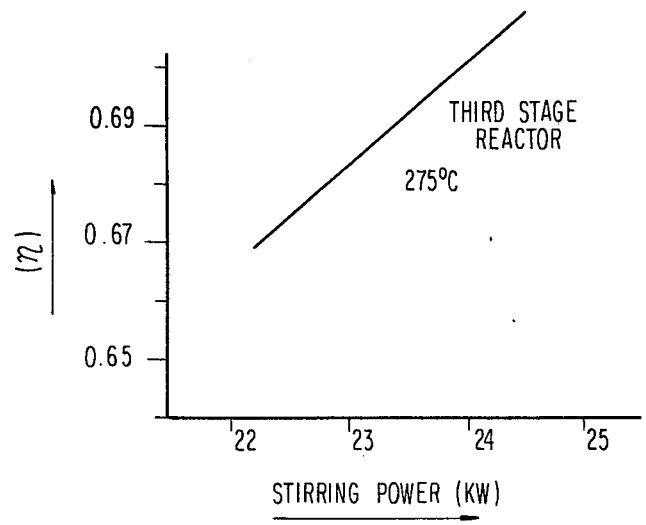

The reaction temperature of the second stage reactor 2 was kept at 275° C. and the revolving rate of the stirrer was 20 rpm. The stirring power thereof was continuously measured and the degree of vacuum was controlled by cascade control by PID control so that the measurement value was kept at 20.0 kw. The reaction temperature of the third stage reactor was kept at 275° C. and the revolving rate of the stirrer was 15 rpm. The stirring power thereof was continuously measured, and the degree of vacuum was contolled by cascade control by PID control so that the measurement value was kept at 24.5 kw. The relationship between the stirring power and the limiting viscosity of the polymer in the second and third stage reactors is shown in FIGS. 2A and 2B, respectively.

The polymer after conclusion of the polymerization reaction was continuously removed from the third stage reactor 3 into the intermediate tank 6, and continuously spun by a spinning nozzle 10 by means of the pressure rising pump 7 and the spinning pump 9. Further, since the variation in the spinning amount shows up as a variation in the liquid level in the intermediate tank 6 the liquid level was continuously measured by a liquid level meter and the feed rate in the first stage polymerization reactor 1 was controlled in order to keep the liquid level within a prescribed range. The operation was carried out continuously for one week. During the operation, the polymer removed from the third stage polymerization reactor 3 was sampled at two hours intervals, and the limiting viscosity ($\eta$) was measured. The results obtained are shown in Table 1.

Further, the limiting viscosity of the polymer removed from the first stage polymerization reactor and that of the polymer removed from the second stage polymerization reactor were about 0.15 to 0.20 and about 0.40 to 0.45, respectively.

EXAMPLE 2

A process was carried out under the same conditions as in Example 1, except that the degree of vacuum in the second stage polymerization reactor 2 was maintained at 3.2 Torr and cascade control of the vacuum as in Example 1 was not carried out. The stirring power in reactor 2 was merely observed. The degree of vacuum in the third stage polymerization reactor 3 was controlled by cascade control based on the stirring power as in Example 1.

The results obtained by continuous operation for 1 week are shown in Table 1.

COMPARISON EXAMPLE 1

The melt viscosity of the polymer fed into the third stage polymerization reactor 3 from the second stage polymerization reactor 2 was measured by melt viscosimeter 5. The melt viscosity recorder 21 was substituted by a recording controller and cascade control of the degree of vacuum was carried out by PID control so that the indication value was kept at 550 poises at 275° C. Accordingly, the stirring power recording controller 20 was substituted by a recorder, by which only the stirring power was recorded.

In the third stage polymerization reactor 3, cascade control of the vacuum with melt viscosity was carried out by the same method as in the second stage polymerization reactor 2, but the standard value of melt viscosity was 2800 poises at 275° C. The other operations were conducted as in Example 1. The results obtained by continuous operation for 1 week are shown in Table 1.

TABLE 1

|  | 2nd Reactor Stirring Power | 3rd Reactor Stirring Power | Limiting Viscosity ($\eta$) |
| --- | --- | --- | --- |
|  | (kw) | (kw) |  |
| Example 1 | 20.0 ± 0.72 | 24.5 ± 0.09 | 0.680 ± 0.0018 |
| Example 2 | 20.0 ± 1.51 | 24.5 ± 0.25 | 0.680 ± 0.0032 |
| Comparison Example 1 | 20.0 ± 1.23 | 24.5 ± 0.73 | 0.680 ± 0.0085 |

As is clear from Table 1, in Example 1 where the method of the present invention is used, the degree of polymerization is controlled with very good accuracy and it is possible to keep the variation of the degree of polymerization within an acceptable range (below ±0.0040) for a long period of time. In Example 2 where the control is conducted only in the third stage reactor 3, though the result is somewhat inferior to that of Example 1, the variation of the degree of polymerization is kept within the acceptable range for a long period of time. On the other hand, in Comparison Example 1 where the melt viscosity of the polymers at the outlets of the second and the third stage polymerization reactors and the cascade control of the degree of vacuum is carried out so that the measurement value is kept at a prescribed value, it is not possible to keep the unevenness of the degree of polymerization within an industrially acceptable range for a long period of time, because the response of the melt viscosity of the polymer at the outlet of the reactor to factors which disturb the polymerization reaction is inferior.

While the invention has been described in detail and with reference to specific embodiments thereof, it will be apparent to one skilled in the art that various changes and modifications can be made therein without departing from the spirit and scope thereof.

What is claimed is:

1. In a continuous process for producing polyester which comprises continuously polymerizing bis-$\beta$-hydroxyethyl terephthalate and/or a lower polymer thereof using a plurality of vacuum polymerization reactors equipped with a stirrer and disposed in series, the improvement which comprises automatically and continuously measuring the stirring power or stirring axis reaction force of at least the final polymerization reactor from which a polymer having a limiting viscosity ($\eta$) of 0.25 or more is removed, and controlling the vacuum in the polymerization reactors according to changes in the stirring power or reaction force so that the stirring power or reaction force value is kept at a prescribed level, by which the degree of polymerization of the polymer removed from the polymerization reactors is controlled.

2. The process of claim 1, wherein the stirring power or stirring axis reaction force of the last reactor in the series is measured.

3. The process of claim 1, wherein the stirring power or stirring axis reaction force of each of the reactors from which a polymer having a limiting viscosity of 0.25 or more is removed, is measured.

4. The process of claim 1, wherein said vacuum control is accomplished by cascade control.

5. The process of claim 1, wherein said vacuum control is accomplished by PID control.

6. In a process for producing a spun fiber from polyethylene terephthalate polymer which comprises continuously polymerizing bis-$\beta$-hydroxyethyl terephthalate and/or a lower polymer thereof using a plurality of vacuum polymerization reactors equipped with a stirrer and disposed in series, and spinning the continuously produced polymer, the improvement which comprises automatically and continuously measuring the stirring power or stirring axis reaction force of at least the final polymerization reactor from which a polymer having a limiting viscosity ($\eta$) of 0.25 or more is removed, and controlling the vacuum in the polymerization reactors according to changes in the stirring power or reaction force so that the stirring power or reaction force value is kept at a prescribed level, by which the degree of polymerization of the polymer removed from the polymerization reactor is controlled.

7. The process for producing a spun fiber of claim 6, wherein the stirring power or stirring axis reaction force of the last reactor in the series is measured.

8. The process for producing a spun fiber of claim 6, wherein the stirring power or stirring axis reaction force of each of the reactors from which a polymer having a limiting viscosity of 0.25 or more is removed, is measured.

9. The process of claim 6, wherein said vacuum control is accomplished by cascade control.

10. The process of claim 6, wherein said vacuum control is accomplished by PID control.

11. The process of claims 1 or 6, wherein three polymerization reactors are used under the following conditions:

| first reactor | second reactor | third reactor |
|---|---|---|
| 270–280° C. | 270–285° C. | 270–285° C. |
| 15–30 Torr | 3–6 Torr | 0.5–3.0 Torr. |

* * * * *